United States Patent [19]

Harada

[11] Patent Number: 5,447,696
[45] Date of Patent: Sep. 5, 1995

[54] ELECTRICALLY HEATED CATALYTIC CONVERTER SYSTEM FOR AN ENGINE

[75] Inventor: Kenichi Harada, Susono, Japan

[73] Assignee: Toyota Jidosha Kabushiki Kaisha, Toyota, Japan

[21] Appl. No.: 260,995

[22] Filed: Jun. 16, 1994

[30] Foreign Application Priority Data

| Jun. 29, 1993 | [JP] | Japan | 5-159081 |
| Jul. 19, 1993 | [JP] | Japan | 5-178088 |
| Aug. 23, 1993 | [JP] | Japan | 5-207417 |

[51] Int. Cl.⁶ ........................................... F01N 3/20
[52] U.S. Cl. .................. 422/174; 422/108; 422/173; 422/180; 60/277; 60/284; 60/286; 60/300
[58] Field of Search ............... 422/173, 108, 174, 109, 422/180, 110; 60/300, 277, 284, 286

[56] References Cited

U.S. PATENT DOCUMENTS

| 5,233,831 | 8/1993 | Hitomi et al. | 60/284 |
| 5,261,230 | 11/1993 | Yuuki et al. | 422/174 |
| 5,315,824 | 5/1994 | Takeshima | 422/174 |
| 5,323,607 | 6/1994 | Tanaka et al. | 60/300 |

FOREIGN PATENT DOCUMENTS

63-16156 1/1988 Japan.
5-5413 2/1993 Japan.
5-202735 8/1993 Japan.

*Primary Examiner*—Robert J. Warden
*Assistant Examiner*—Hien Tran
*Attorney, Agent, or Firm*—Oliff & Berridge

[57] ABSTRACT

An electrically heated catalytic converter system of the present invention includes a plurality of heater-converters, each heater-converter being disposed on one of a plurality of exhaust passages of an engine. Each heater-converter includes a catalyst bed which carries particles of a three-way reducing and oxidizing catalyst, an electric heater which is turned on during the start up of the engine to rapidly heat at least a portion of the catalyst bed, and a temperature detector disposed in the catalyst bed. The system also includes an electronic control unit (ECU) that detects the failure of the converter system. When the engine is started, the ECU calculates the difference in the temperatures of the catalyst beds, and if this difference in the temperatures becomes larger than a predetermined value, the ECU determines that one of the heater-converters has failed, i.e., the electrically heated catalytic converter system has failed. The failure of the converter system can also be determined by comparing the rate of temperature rise of the converters, or by determining a temperature or rate of temperature rise difference between a catalytic converter and the exhaust gas entering the catalytic converter.

17 Claims, 16 Drawing Sheets

ELECTRICALLY HEATED CATALYTIC CONVERTER SYSTEM FOR AN ENGINE

BACKGROUND OF THE INVENTION

1. Field of the Invention

The present invention relates to an electrically heated catalytic converter system for an engine that has a catalytic converter equipped with an electric heater, and more specifically, relates to such a system applied to an engine having a plurality of exhaust passages.

2. Description of the Related Art

An exhaust gas purification device that utilizes a three-way reducing and oxidizing catalytic converter disposed on the exhaust passage of the internal combustion engine is commonly used. Generally, the catalyst used in such converters is able to purify the pollutants in the exhaust gas only when the temperature of the catalyst becomes higher than a certain temperature, i.e., the catalysts in the converter do not work when the temperature of the catalyst is lower than an activating temperature.

Usually, the catalyst in the converter is gradually heated by the exhaust gas of the engine and reaches the activating temperature once the engine starts. However, when the temperature of the engine is low, such as during a cold start, it takes a substantially long time to heat up the catalyst to the activating temperature since the heat of the exhaust gas is taken by the cold wall of the exhaust passage before reaching the converter. Therefore, in the cold start of the engine, the exhaust gas of the engine is not sufficiently purified since the temperature of the catalyst is lower than the activating temperature.

To solve this problem, Japanese Unexamined Utility Model Publication (KOKAI) No. 4T-22313 discloses a catalytic converter which is equipped with an electric heater for heating up the catalyst during starting up of the engine. In this device, the electric heater is switched on when the engine is started to heat up the catalyst so that the temperature of the catalyst reaches the activating temperature in a short time.

Even in the electrically heated catalytic converter system, the emission in the exhaust gas during start-up is worsened, if the converter system, especially, the electric heater, fails. However, in the system such as disclosed in Japanese Unexamined Utility Model Publication (KOKAI) No. 4T-22313, the operation of the engine is not affected even if the converter has failed. Therefore, the operator of the engine may not notice the failure of the converter even if the failure actually occurs. In this case, the engine is operated with a failed heater, and thus with increased emissions during the start up of the engine.

Therefore, it is necessary to detect the failure of the converter system to assure its proper operation during the start up of the engine.

However, it is difficult to detect the failure of the converter system accurately in actual use. For example, it may be possible to determine that the converter system has failed if the temperature of the converter does not become higher than a predetermined value even when a predetermined time has lapsed after the electric heater is switched on at the start up of the engine. However, in some cases the temperature of the converter becomes high in a short time after the engine starts due to the heat generated by oxidation of HC and CO in the exhaust gas without being heated by the electric heater. In such a case, the temperature of the catalyst exceeds the predetermined value shortly after the engine start even if the electric heater has failed, and thus the failure of the electric heater cannot be detected.

Also, for example, if the catalyst in the catalytic converter deteriorates, or the resistance of the lead wires of the heater increases due to corrosion of the lead wire, the time required to heat up the catalyst becomes longer. In these cases, the time required for heating up the catalyst increases gradually as the deterioration of the catalyst or corrosion in the lead wires proceeds. In such cases, if the failure of the catalyst or electric heater is detected by the above method, i.e., if it is determined that the converter system has failed only when the temperature of the catalyst does not exceed a fixed predetermined value, the failure cannot be detected until the deterioration of the catalyst or the corrosion of the lead wire proceeds to some extent. This may prevent the failures from being detected in early stages of the failure.

SUMMARY OF THE INVENTION

In view of the problems set forth above, the object of the present invention is to provide an electrically heated catalytic converter system applied to an engine having a plurality of exhaust passages, which is capable of detecting the failure of the converter system including, for example, deterioration of the catalysts or corrosion of the lead wire, accurately.

According to the present invention, there is provided an electrically heated catalytic converter system for an engine having a plurality of exhaust passages, the electrically heated catalytic converter system comprising, a plurality of electrically heated catalytic converters each disposed on respective exhaust passages. Each electrically heated catalytic converter comprises a catalyst for removing pollutants in the exhaust gas and a heating means for electrically heating the catalyst after the engine starts. Also provided are a temperature rise detecting means for detecting parameters relating to the temperature rise of the respective catalysts; a means for collating the values of the parameters of the respective catalysts, and a determining means for determining that the electrically heated catalyst converter system has failed when the difference between the values of said parameters of two catalysts exceeds a predetermined value.

BRIEF DESCRIPTION OF THE DRAWINGS

The present invention will be better understood from the description as set forth hereinafter, with reference to the accompanying drawings, in which.

DESCRIPTION OF THE PREFERRED EMBODIMENTS

Figure 1:
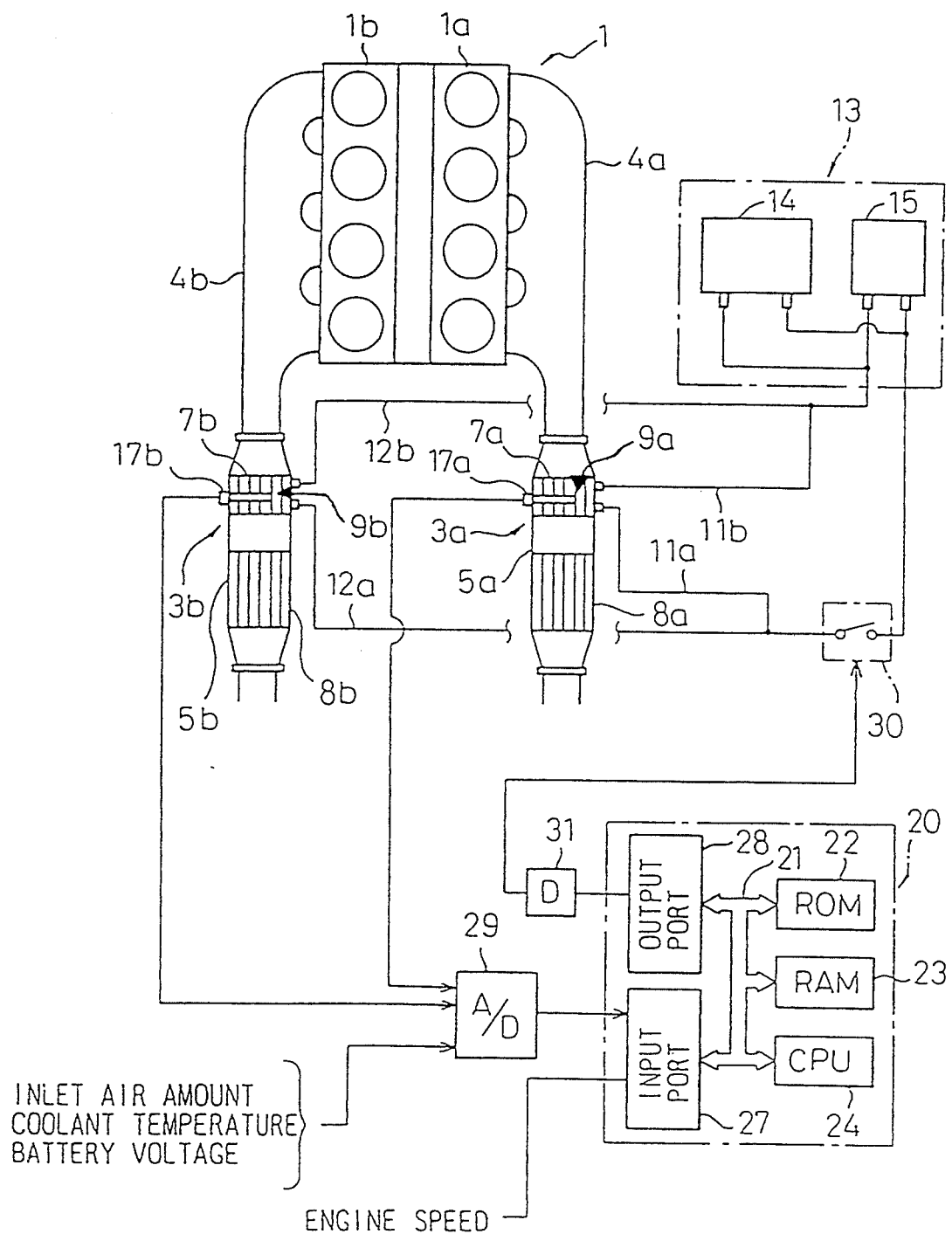
FIG. 1 is a schematic view of an internal combustion engine showing an embodiment of the present invention.

FIG. 1 schematically illustrates an embodiment of the electrically heated catalytic converter system according to the present invention.

In FIG. 1, reference numeral 1 represents an internal combustion engine. In this embodiment, the engine 1 is an eight cylinders V-type automobile engine, which has two cylinder banks 1a and 1b. Numerals 4a and 4b represent independent exhaust passages connected to the cylinder banks 1a and 1b, respectively. Numerals 3a and 3b represent catalytic converters disposed on the exhaust passages 4a and 4b respectively.

In this embodiment, each catalytic converter 3a and 3b comprises a cylindrical casing 5a, 5b, a heater-converter 7a, 7b and a main converter 8a, 8b, both disposed in said cylindrical casings 5a and 5b. As explained later, the heater-converters 7a and 7b are electrically heated converters having metal substrates 9a, 9b which also act as electric heaters. When the engine 1 starts, electric currents are fed to the heater-converters 7a and 7b and the temperatures of the heater-converters increase rapidly and reach the activating temperature within a short time. Thus, the catalysts carried on the heater-converter 7a and 7b are activated and start to purify the exhaust gas of the engine as soon as the engine 1 starts.

Main converters 8a and 8b are common type catalytic converters having metal or ceramic honeycomb type substrates and having larger capacities than the heater-converters 7a, 7b. Since the main converters 8a, 8b are disposed downstream of the heater-converters 7a and 7b in the casing 5a, 5b, when the heater-converters reach the activating temperature and the catalytic action starts in the heater-converters, the exhaust gas which is heated by the oxidation of HC and CO components in the exhaust gas in the heater-converters flows into the main converters 8a and 8b. Thus the temperatures of the main converters 8a and 8b also reach the activating temperature in a short time after the engine starts.

Figure 2:
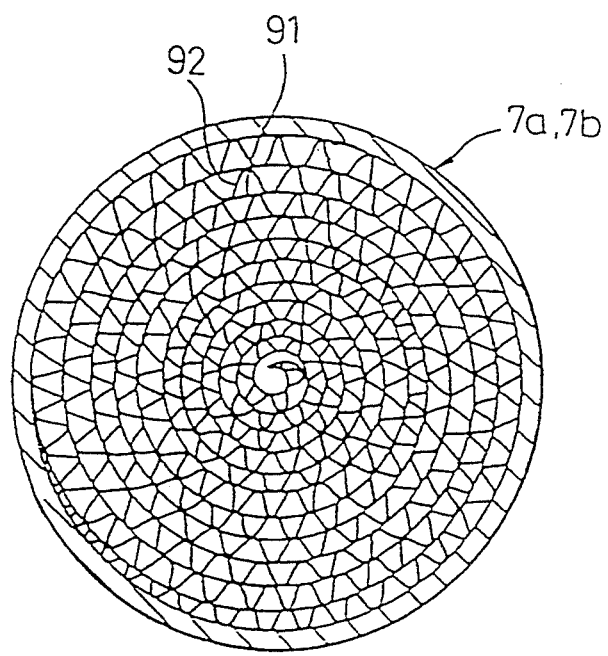
FIG. 2 is a cross-sectional drawing showing the construction of the heater-converter.

FIG. 2 is a cross-sectional drawing which illustrates the construction of the heater-converters 7a and 7b. In this embodiment, the heater-converters 7a, 7b comprise a plain, thin metal sheet 91 and a corrugated thin metal sheet 92 The plain metal sheet 91 and the corrugated metal sheet 92 are placed one upon another and wound around a common center so that the metal sheets form a scroll like cylinder. Three-way reducing and oxidizing catalyst of known type is attached on the surfaces of the thin metal sheets 91 and 92.

When electricity is fed to the heater-converter 7a, 7b, electric currents flow through the metal sheets 91 and 92, thus the metal sheets 91, 92 themselves act as a heating element of the heater to heat the catalyst particles carried thereon. Namely, the plain metal sheet 91 and the corrugated metal sheet 92, when combined, act as heater elements 9a and 9b as well as substrates of the catalyst particles.

As illustrated in FIG. 1, the heaters 9a and 9b are connected in parallel to an electric power source 13 via lead wires 11a, 12a and 11b, 12b respectively. The electric power source 13 consists of a battery 14 and an alternator 15 of the engine 1. Also, a common relay 30 is provided on the lines 11a and 12a. The relay 30 is set ON and OFF by the signal from an electronic control unit (ECU) 20 in such a manner that ON and OFF of the heaters 9a and 9b can be controlled simultaneously.

The electronic control unit 20, which may include a microcomputer, comprises a central processing unit (CPU) 24, a read-only-memory (ROM) 22, a random-access-memory (RAM) 23 and an input port 27 and an output port 28, all mutually connected by a bus 21. The ECU 20 controls fuel injections and ignition timing of the engine and, in this embodiment, ON/OFF operation of the heaters 9a, 9b of the heater-converters 7a, 7b in the catalytic converters 3a, 3b.

To perform such controls, various signals, are fed to the input port 27 of ECU 20 via an AD converter 29. These signals are, for example, a voltage signal proportional to an amount of intake air which is generated by an airflow meter (not shown) disposed on an intake air passage of the engine, a voltage signal proportional to a temperature of the engine coolant which is generated by a coolant temperature sensor (not shown) disposed on a water jacket of the engine 1 and a signal corresponding to a voltage of the battery 14. Also, a pulse signal from an engine speed sensor (not shown) disposed on a distributor of the engine 1 which represents an engine speed and an ON/OFF signal of a starter motor (not shown) from starter switch (not shown) are fed to the input port 27.

Figure 3A:
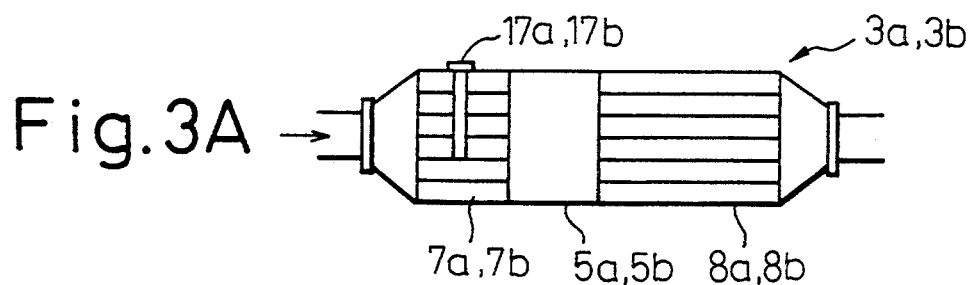
FIGS. 3A, 3B, 3C and 3D illustrate various locations of the temperature sensor disposed on the heater-converter.

Further, in this embodiment, temperature sensors 17a and 17b are embedded in the catalyst beds of the heater-converters 7a, 7b as shown in FIG. 3A. Output signals of these temperature sensors 17a and 17b which correspond to the temperatures of the catalyst beds of the heater-converter 7a, 7b are fed to input port 27 of the ECU 20 via the AD converter 29.

The output port 28 of the ECU 20 is connected to the relay 30 via a driver circuit 31 to control ON/OFF operation of the heaters 9a and 9b of the heater-converters 7a and 7b.

Next, an embodiment of the detection of the failure of the electrically heated catalytic converter system according to the present invention is explained.

In this embodiment, the failure of the system is detected based on the difference in the temperature of the heater-converters 7a and 7b after the heaters 9a and 9b are switched on. As explained before, if the failure of the electrically heated converter system is to be determined by only the temperature of the catalyst bed, errors will be involved in the determination due to difference in the temperature condition of the exhaust gas or the deterioration of the catalyst. On the other hand, by determining the failure of the electrically heated converter system based on the difference of the temperatures of the heater-converters 7a and 7b, such errors are eliminated. Since the exhaust passages 4a and 4b, on which the catalytic converters 3a and 3b are disposed are connected to the same engine 1, the conditions of the exhaust gases flowing into converters 3a and 3b, such as compositions and rate of temperature rise, are identical. Therefore, the temperatures detected by the sensors 17a and 17b after the heaters 9a and 9b are switched on must be the same. Namely, if a substantial difference is found in the temperatures detected by the sensors 17a and 17b, it means that one or more of the components of the electrically heated converter system, such as heater-converters 7a, 7b, heaters 9a, 9b, or temperature sensors 17a and 17b is not working properly, i.e., that a failure of the converter system has occurred.

Further, by detecting the failure based on the difference in the temperatures of the catalyst beds, the difference in the conditions of the catalytic converters 3a and 3b can be detected accurately without being affected by the conditions of the exhaust gas, and the failures such as the deterioration of the catalyst or the corrosion of the lead wire can be detected in the early stage of the failures.

Figure 4:
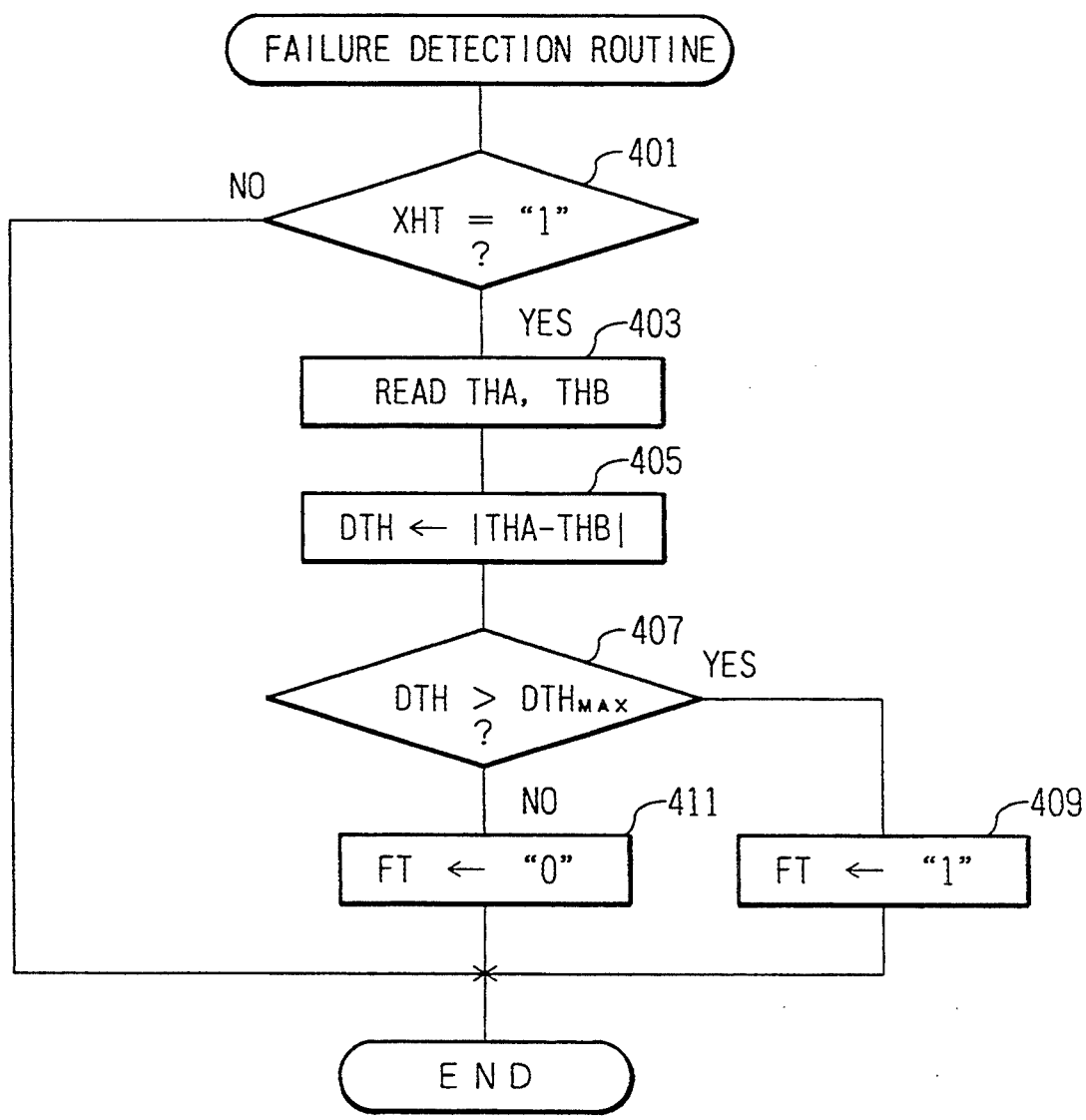
FIG. 4 is a flowchart showing an example of a routine for detecting the failure of the converter system.

FIG. 4 shows a routine for detecting the failure of the converter system according to the present embodiment. This routine is performed by the ECU 20 at predetermined intervals.

When the routine starts in FIG. 4, at step 401, it is determined whether the value of an operation flag XHT is equal to 1. If the value of the flag XHT is 1 at step 401, the relay 30 is closed by another routine performed by the ECU 20 (not shown) to switch on the heaters 9a and 9b.

The flag XHT is set to be either 1 or 0 by a routine separately performed by the ECU 20. In this embodiment, the flag XHT is set to be 1 when all of the following conditions are satisfied:

(1) the engine coolant temperature THW is within a predetermined range (for example, $-10°$ C.$\leq$THW$\leq$30° C.);

(2) a secondary air is fed to the catalytic converters 3a and 3b;

(3) the engine start up operation is completed, i.e., the engine speed is more than a predetermined value (for example, more than 400 rpm);

(4) an accumulated total value of the amount of the inlet air after the engine is started is smaller than a predetermined value, i.e., the accumulated engine load is less than a predetermined value;

(5) a predetermined time (for example, ten seconds) has not lapsed since the engine started;

(6) the starter switch is off, i.e., the starter motor is not running; and (7) the battery terminal voltage is more than a predetermined value (for example, 11 volts).

The reason why the heaters are switched on only when the engine coolant temperature is within a predetermined range (above condition (1)) is, on the one hand, if the coolant temperature is sufficiently high, it is not necessary to heat the catalyst since the temperature of the exhaust gas is high enough even at the engine start, and on the other hand, if the coolant temperature is very low, the amount of the fuel supply to the engine is being increased to enable cold start, and since the HC component in the exhaust gas is increased due to the fuel increment, the catalyst will be over-heated if further heated by the heaters.

The reason why the heaters are switched on only when the secondary air is supplied to the catalytic converter (above condition (2)) is that the oxidizing reaction of HC component on the catalyst hardly occurs if the secondary air is not supplied after the engine is started.

Further, the reason why the heaters are switched off when the cumulative amount of the inlet air becomes larger than a predetermined value (above condition (4)), or a predetermined time has lapsed after the engine starts (above condition (5)), is that, if one of these conditions is satisfied, the temperature of the exhaust gas becomes sufficiently high.

The conditions (3), (6), (7) are required to reduce the load of the battery while the heaters are ON and to make the operation of the engine stable during startup by preventing the battery voltage from becoming excessively low.

If the heaters 9a, 9b are ON (i.e., XHT=1 at step 401), the routine proceeds to step 403 in FIG. 4, which reads the temperature THA and THB of the catalyst beds of the heater-converters 7a and 7b, and then to step 405, which calculates the difference DTH between THA and THB.

At step 407, it is determined whether DTH exceeds a predetermined value $DTH_{MAX}$. As explained before, it can be considered that the converter system has failed if the difference of the temperatures of the converters 7a and 7b is large. Therefore, when $DTH > DTH_{MAX}$ at step 407, the routine proceeds to step 409 to set an alarm flag FT to 1. On the contrary, if DTH is not larger than $DTH_{MAX}$ at step 407, since it is considered that the converter system is normal, the routine proceeds to step 411 which sets the alarm flag FT to 0. Though it is not illustrated in FIGS. 1 and 4, an alarm may be activated when the flag FT is set to be 1 in order to warn the operator of the failure of the converter system. The value of $DTH_{MAX}$ is set, preferably, as small as possible to detect the failure at an early stage, but at the same time, $DTH_{MAX}$ must be large enough to prevent normal converters from being incorrectly determined as failed due to the normal scattering of the temperatures of the converters 7a and 7b. The actual value of $DTH_{MAX}$ varies depending on types of the catalysts and arrangements of the exhaust passages and is preferably determined by experiments.

Figure 5:
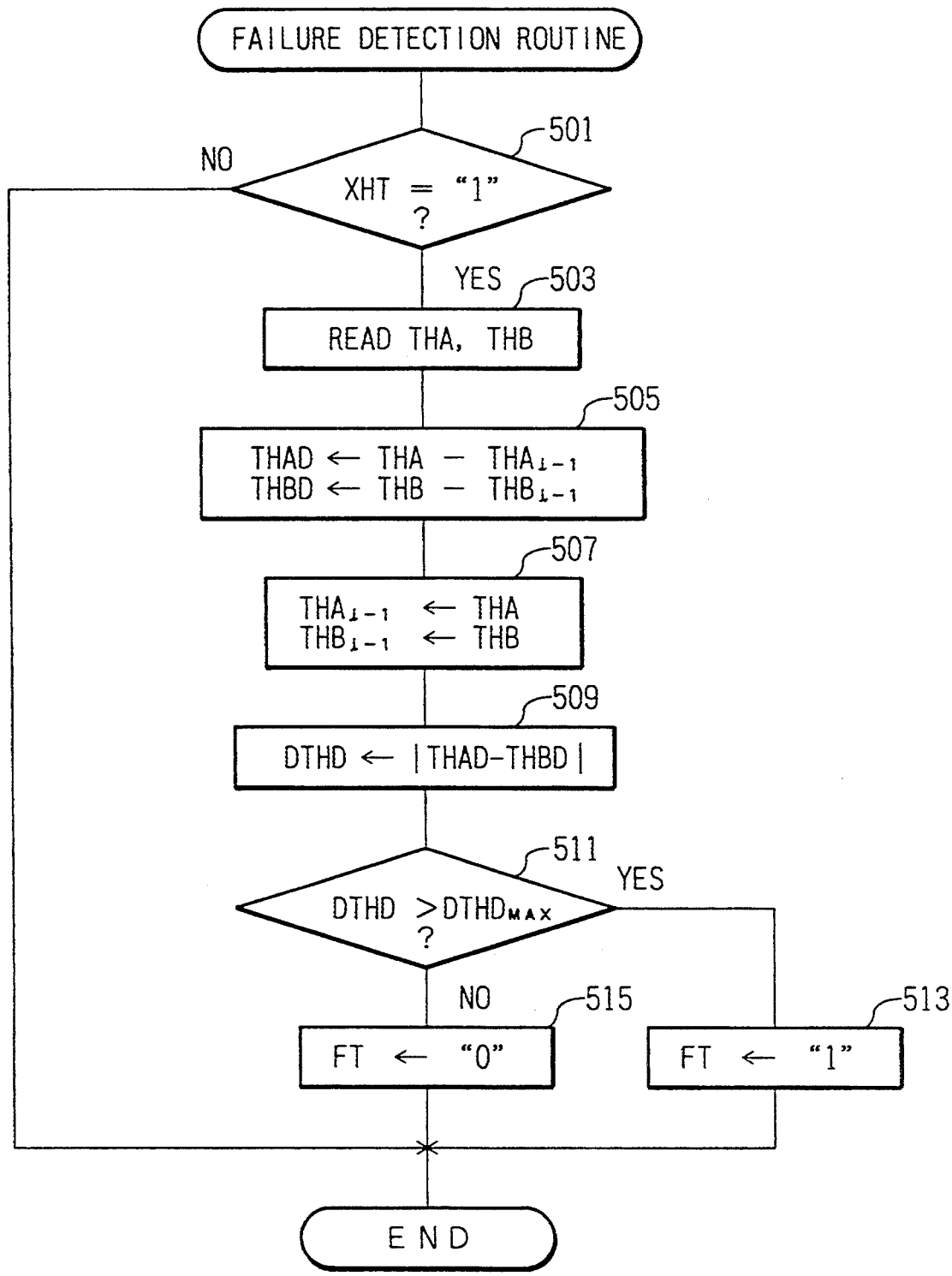
FIG. 5 is a flowchart showing an example of a routine for detecting the failure of the converter system.

Next, another embodiment of the detection of the failure of the converter system is explained using FIG. 5.

In this embodiment, the parameters relating to the temperature rise of the heater converter are also used to detect the failure of the converter system. However, the parameters used are rates of increase of the temperatures of the heater-converters 7a and 7b, instead of the temperatures themselves. Namely, in this embodiment, the ECU 20 calculates the rates of increase of bed temperatures of the heater-converter 7a, 7b, and determines whether the converter system has failed based on the difference of the rates of increase of the temperatures (rates of temperature rise) of the heater-converters 7a, 7b.

When the routine starts, in FIG. 5, at step 501, the value of the operation flag XHT is determined, and when the flag is set to be 1, the temperatures THA and THB are read from the respective temperature sensors at step 503. These steps are exactly the same as steps 401 and 403 in FIG. 4.

Then, at step 505, the rates of temperature rise THAD and THBD of the heater-converters 7a and 7b, respectively, are calculated using the temperatures THA, THB and $THA_{i-1}$, $THB_{i-1}$, where, $THA_{i-1}$, and $THB_{i-1}$ are the values of THA and THB when the routine was last executed.

After calculating THAD and THBD, the values of $THA_{i-1}$ and $THB_{i-1}$ are updated at step 507, and the difference DTHD of the rates of temperature rise THAD, and THBD is calculated at step 509.

At steps 511, it is determined whether the difference DTHD of the rates of the temperature rise is more than a predetermined value $DTHD_{MAX}$. Then, at steps 513 and 515, the alarm flag FT is set to be 1 or 0 depending on the result of the determination of step 511.

In this embodiment, the value of the $DTH_{DMAX}$ is also set at as small as possible, and is preferably determined by experiments.

Figure 6:
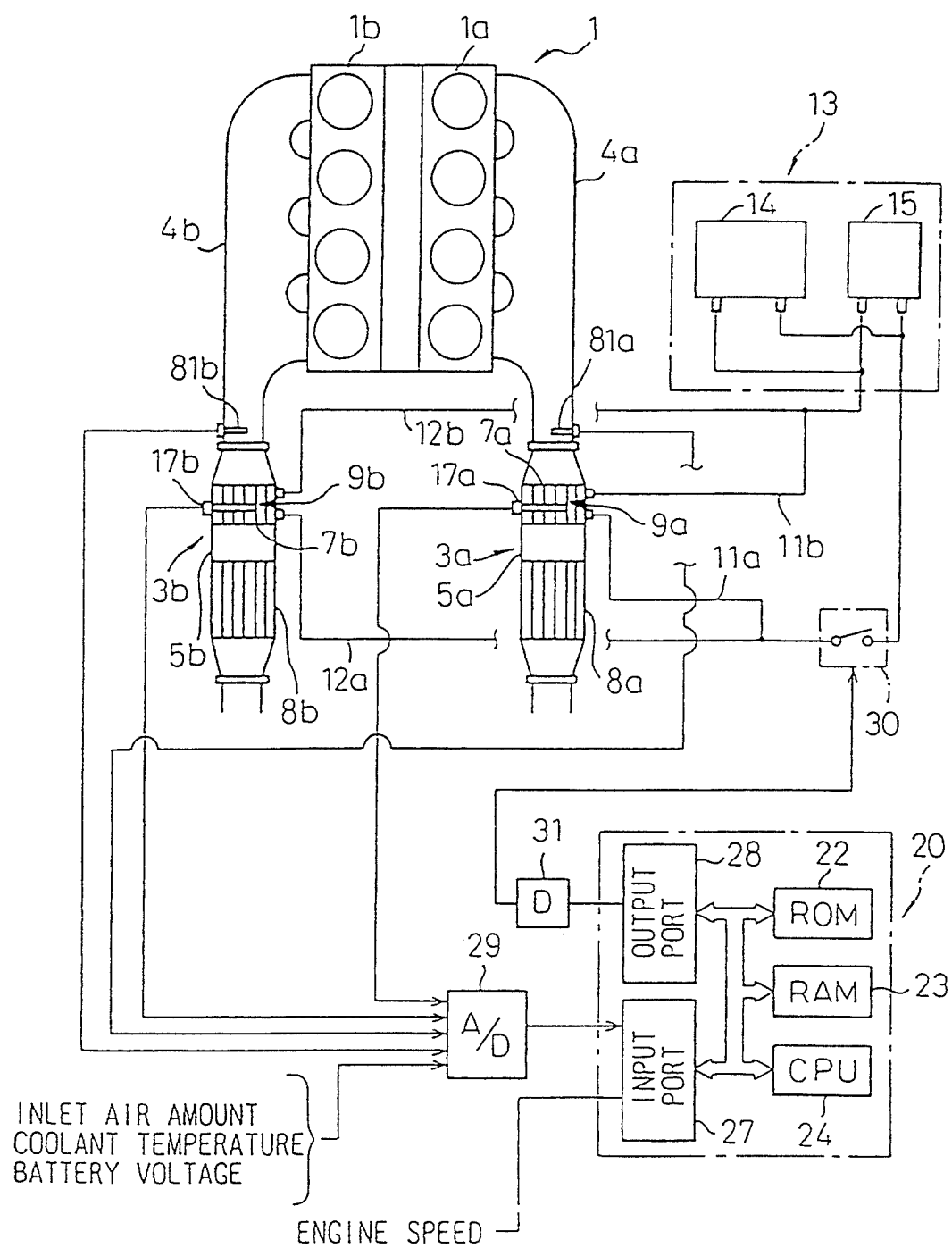
FIG. 6 is a schematic view of an internal combustion engine showing an embodiment of the present invention.

FIG. 6 shows an arrangement of another embodiment of the electrically heated converter system according to the present invention. In FIG. 6, in addition to the temperature sensors 17a and 17b, exhaust temperature sensors 81a and 81b, which generate voltage signals corresponding to the exhaust gas temperatures are disposed on the exhaust passages 4a and 4b at the inlet of the converters 3a and 3b.

Figure 7:
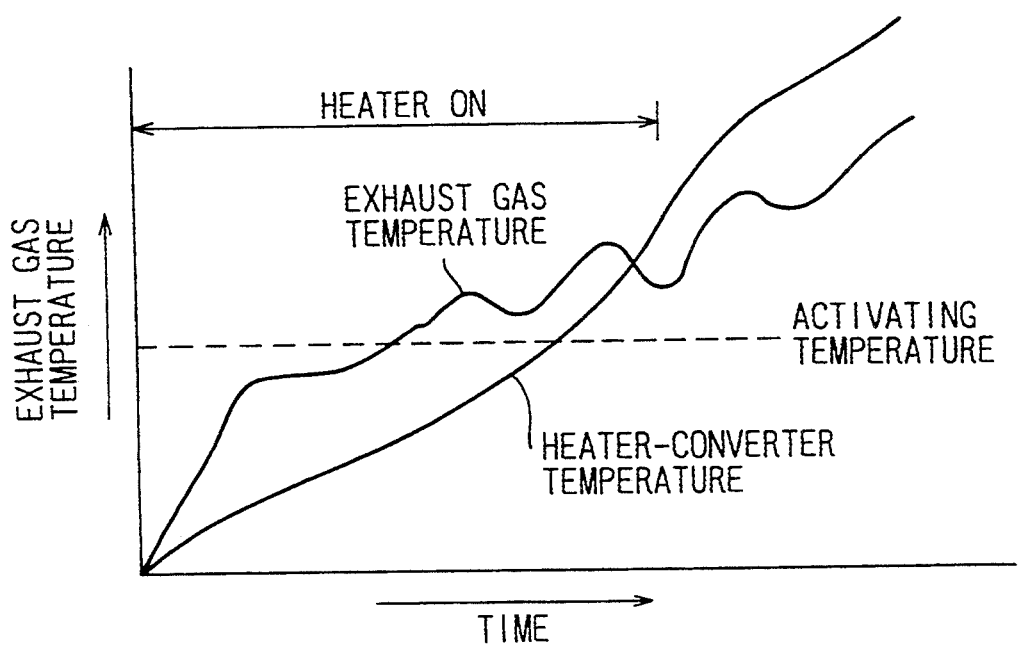
FIG. 7 is a graph illustrating the relationship between the temperatures of the exhaust gas and the converter.

When the engine 1 starts, the heater-converters 7a, 7b are heated by exhaust gas flowing into the converters and by the heaters 9a and 9b disposed in the converters, and the temperature of the heater converters 7a and 7b increases. Then, once the temperature of the converter reaches the activating temperature of the catalyst, the temperature of the converters rise rapidly due to the heat generated by the oxidation of HC, CO in the exhaust gas by the catalyst. FIG. 7 shows the changes in the exhaust gas temperature and the temperature of the heater-converter after the engine starts.

As seen from FIG. 7, when the engine starts, the exhaust gas temperature starts to increase. Since the heater of the heater-converter is switched on, the temperature of the heater-converter also starts to increase and the difference between the exhaust gas temperature and the temperature of the heater-converter is maintained relatively small. After an appropriate time, the temperature of the heater-converter reaches the activating temperature of the catalyst, then the temperature of the heater-converter increases rapidly and becomes higher than the exhaust gas temperature. Therefore, if the temperature of the heater-converter is lower than the exhaust gas temperature by more than a predetermined value even after the heater is ON, it can be considered that the converter system has failed.

Figure 8:
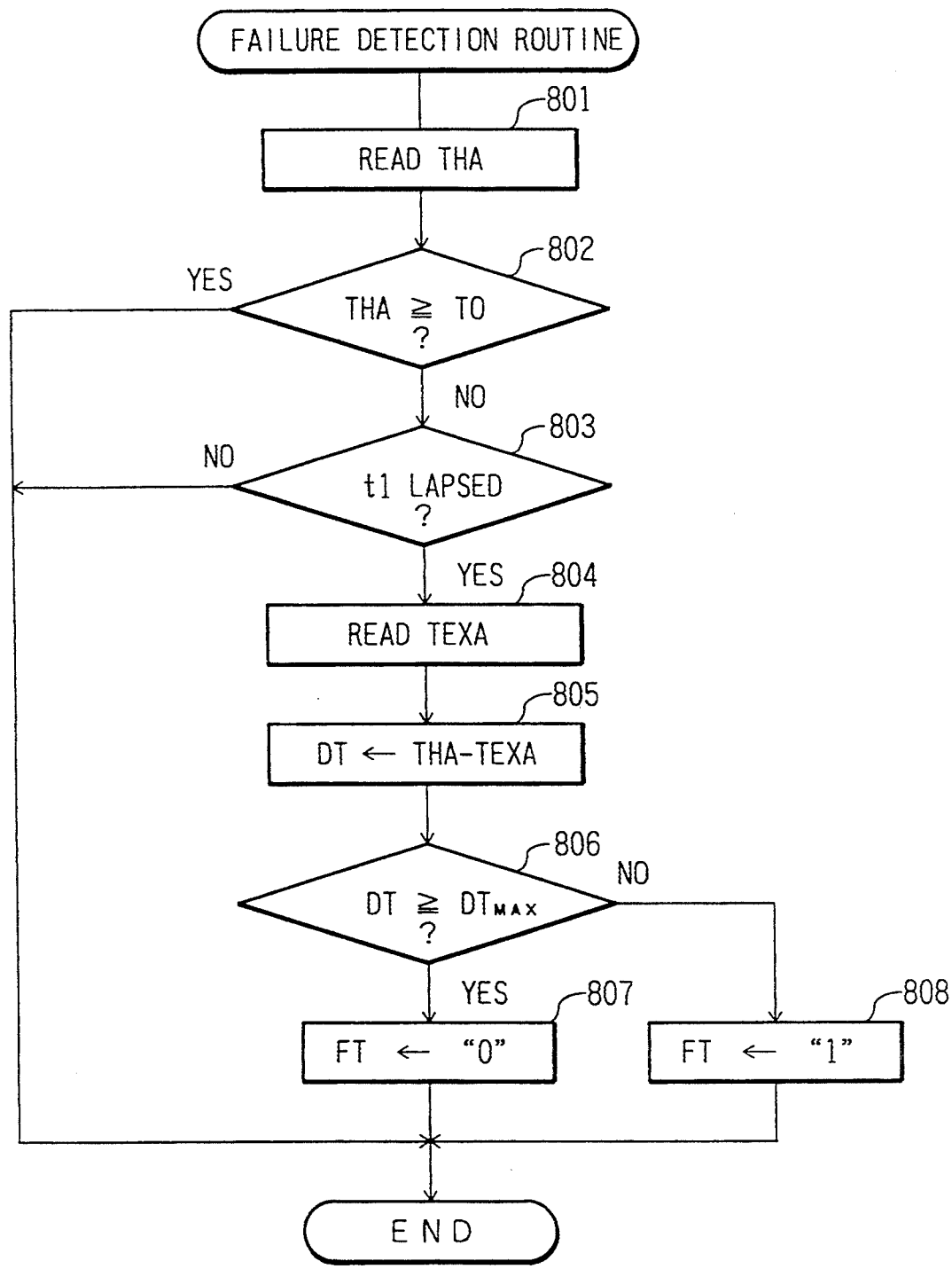
FIG. 8 is a flowchart showing an example of a routine for detecting the failure of the converter system.

FIG. 8 shows an embodiment of the routine for detecting the failure of the converter system using the exhaust gas temperature and the temperature of the heater-converter. This routine is executed by the ECU 20 at predetermined intervals. Though FIG. 8 shows the routine for one heater-converter (for example, 7a) only, the same routine is also executed for another heater-converter (for example, 7b) to detect the failure of both converters.

When the routine starts in FIG. 8, the temperature THA of the heater-converter 7a is read from the temperature sensor 17a at step 801. Then, at step 802, the temperature THA is compared with the activating temperature $T_0$ of the catalyst used. If the temperature THA is higher than or equal to the activating temperature $T_0$, the routine terminates immediately without determining whether the converter system has failed.

If THA is lower than $T_0$, then the routine proceeds to step 803 which determines whether a predetermined time t1 has lapsed after the start up of the engine. If time t1 has lapsed at step 803, the exhaust gas temperature TEX is read from the exhaust temperature sensor 81a, and at step 805, the difference DT between THA and TEX is calculated.

At step 806, it is determined whether the calculated value of DT (DT=THA−TEX) is smaller than a predetermined negative value $DT_{MAX}$ (i.e., the temperature of the heater-converter is substantially low compared with the exhaust gas temperature). If DT is smaller than $DT_{MAX}$ at step 806, since it is considered that the converter system has failed, the alarm flag FT is set to be 1 at step 808. If DT is larger than or equal to the value $DT_{MAX}$ (i.e., the temperature of the heater-converter is sufficiently high), the alarm flag FT is set to be 0 at step 807.

According to this embodiment, the detection of the failure is carried out separately for the respective converters. Therefore, when a failure is found, the failed heater can be identified easily.

In this embodiment, the difference between temperatures of the heater-converter and the exhaust gas is used to detect the failure of the converters. However, other parameters can be also used. For example, rates of the temperature rise of the heater-converter and the exhaust gas, instead of the temperature itself, can be used. In this case, the rates of the temperature rise of the heater-converter and the exhaust gas are calculated by a similar calculation as explained in FIG. 5, and if the difference of these ratios is greater than a predetermined value, it is determined that the converter system has failed.

Next, another embodiment of the detection of the failure of the converter system is explained with reference to FIG. 9. This embodiment also uses the exhaust gas temperature and the temperature of the heater-converters to detect the failure of the converter system. However, in this embodiment, the difference between the exhaust gas temperature and the temperature of the heater-converters are calculated for both heater-converters simultaneously, and the calculated differences of both heater-converters are compared. Since the conditions such as temperature and amount of the exhaust gases flowing into both the heater-converters are identical, this temperature difference must be the same for both the heater-converters if the heating conditions of both the heater-converters are the same. Therefore, if the magnitude of the difference between the temperatures of the exhaust gas and the heater-converter differ more than a certain value, it can be considered that either one of the heater-converters does not work properly, i.e., the converter system has failed. Since the exhaust gas temperature of the engine varies in accordance with the operating condition of the engine after starting, the difference between the temperatures of the exhaust gas and the heater-converter varies accordingly. Therefore, if the failure of the converter system is determined only by the difference between the temperatures of the exhaust gas and the heater-converter as explained in the embodiment in FIG. 8, the accuracy of the detection becomes low in some cases.

On the other hand, since the temperatures of the exhaust gas flowing into both the heater-converters are always the same even if the temperature itself varies in accordance with the operating condition. Therefore, by comparing the differences of the temperatures for both the heater-converters, the failure of the converter system can be detected accurately regardless of the operating condition of the engine.

Figure 9:
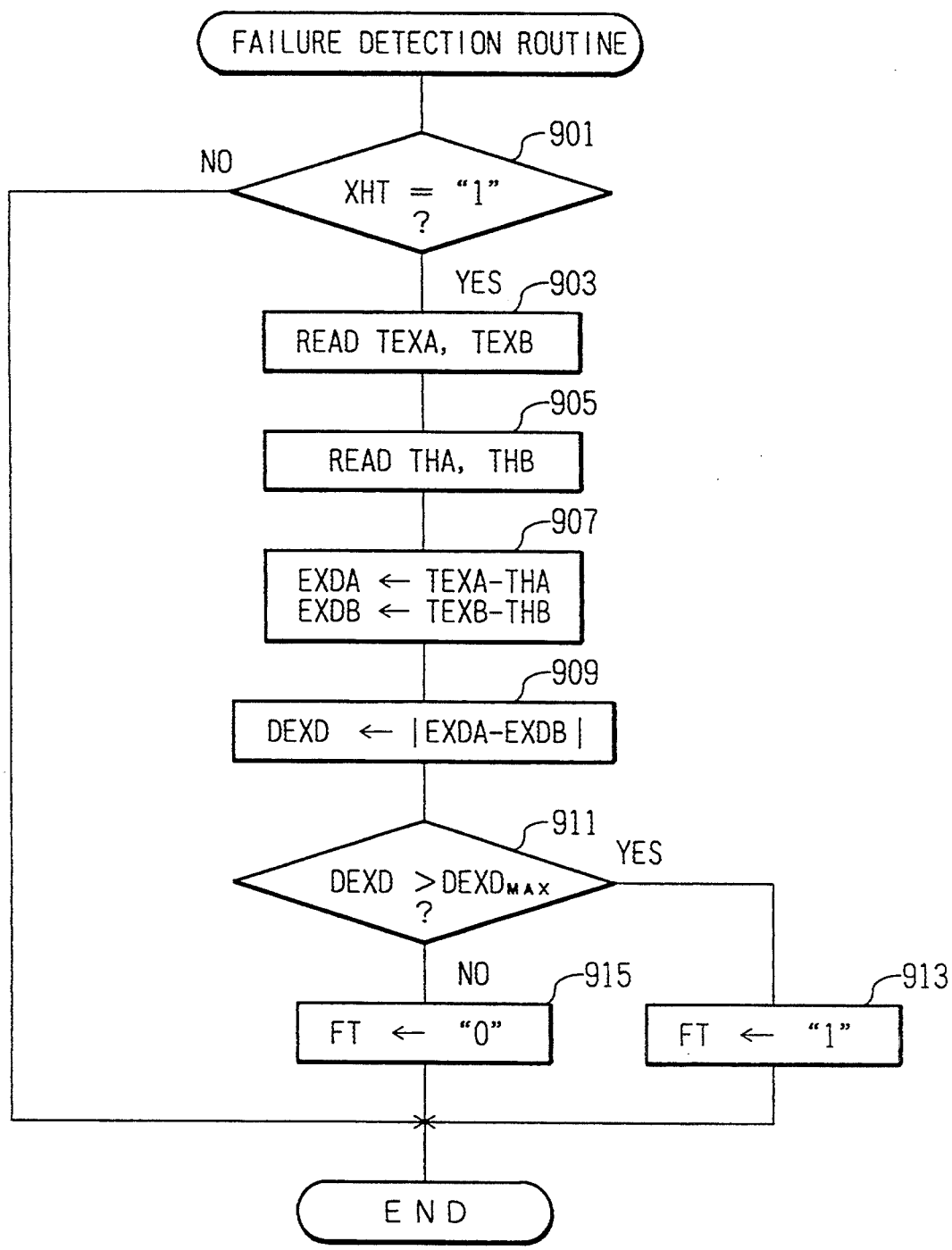
FIG. 9 is a flowchart showing an example of a routine for detecting the failure of the converter system.

FIG. 9 shows an embodiment of the routine for detecting the failure of the converter system according to the method explained above. This routine is also executed by the ECU at predetermined intervals.

When the routine starts in FIG. 9, the value of the operation flag XHT is determined, and when the flag is set to 1, the temperatures TEXA and TEXB of the exhaust gases flowing into the heater-converters 7a and 7b, respectively are read from the exhaust gas temperature sensors 81a and 81b at step 903, and the temperatures THA and THB of the heater-converters 7a and 7b are read from the sensors 17a and 17b at step 905. Then, at step 907, the difference (EXDA, EXDB) between the temperatures of the exhaust gas and the heater-converter is calculated on both the heater-converters. Further, the deviation DEXD between these differences EXDA and EXDB is calculated, at step 909, and this deviation DEXD is compared with a predetermined value $DEXD_{MAX}$ at step 911. If DEXD is larger than $DEXD_{MAX}$, since it is considered that the converter system has failed, the alarm flag FT is set to be 1 at step 913, and if DEXD is smaller than or equal to $DEXD_{MAX}$, the alarm flag FT is set to be 0 at step 915. In this embodiment, the value of the $DEXD_{MAX}$ is also set at as small as possible, and is preferably determined by experiments.

Figure 3B:
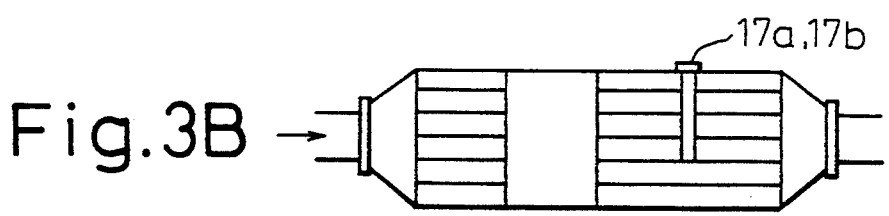

In the embodiments explained above, the temperature sensors 17a, 17b for detecting the temperature of the catalyst beds of the heater-converters 7a, 7b are embedded in the substrates of the heater-converters as shown in FIG. 3A. However, if the temperature conditions of the heater-converters 7a and 7b, such as rates of temperature rise are the same, the temperature conditions of the main converters 8a, and 8b disposed immediately downstream of the heater-converters 7a and 7b also become the same. Therefore, in the above embodiments, the temperature sensors 17a and 17b may be embedded in the substrates of the main converters 8a and 8b as shown in FIG. 3B, instead of heater-converters 7a and 7b. This arrangement is convenient especially when the volume of the heater-converters is too small to accommodate the temperature sensors.

Figure 3C:
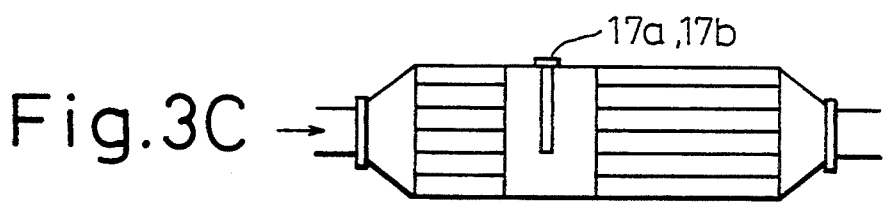
Figure 3D:
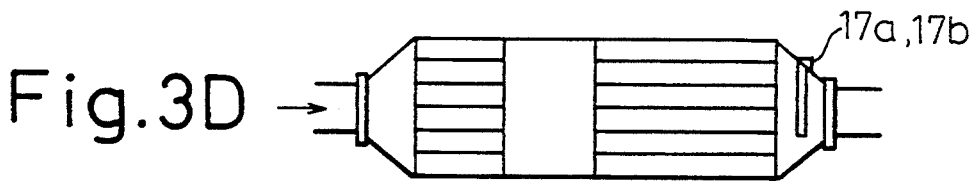

Further, since the temperature of the exhaust gas flowing out from the heater-converters becomes nearly the same temperature as the heater-converters, the temperature sensors 17a and 17b can be disposed at the outlet of the heater-converters 7a and 7b as shown in FIG. 3C, or at the outlet of the main converters 8a, 8b as shown in FIG. 3D. This arrangement of the temperature sensors is advantageous to prevent an increase in the flow resistance of the converters and to keep the mechanical strength of the converters high.

Figure 10:
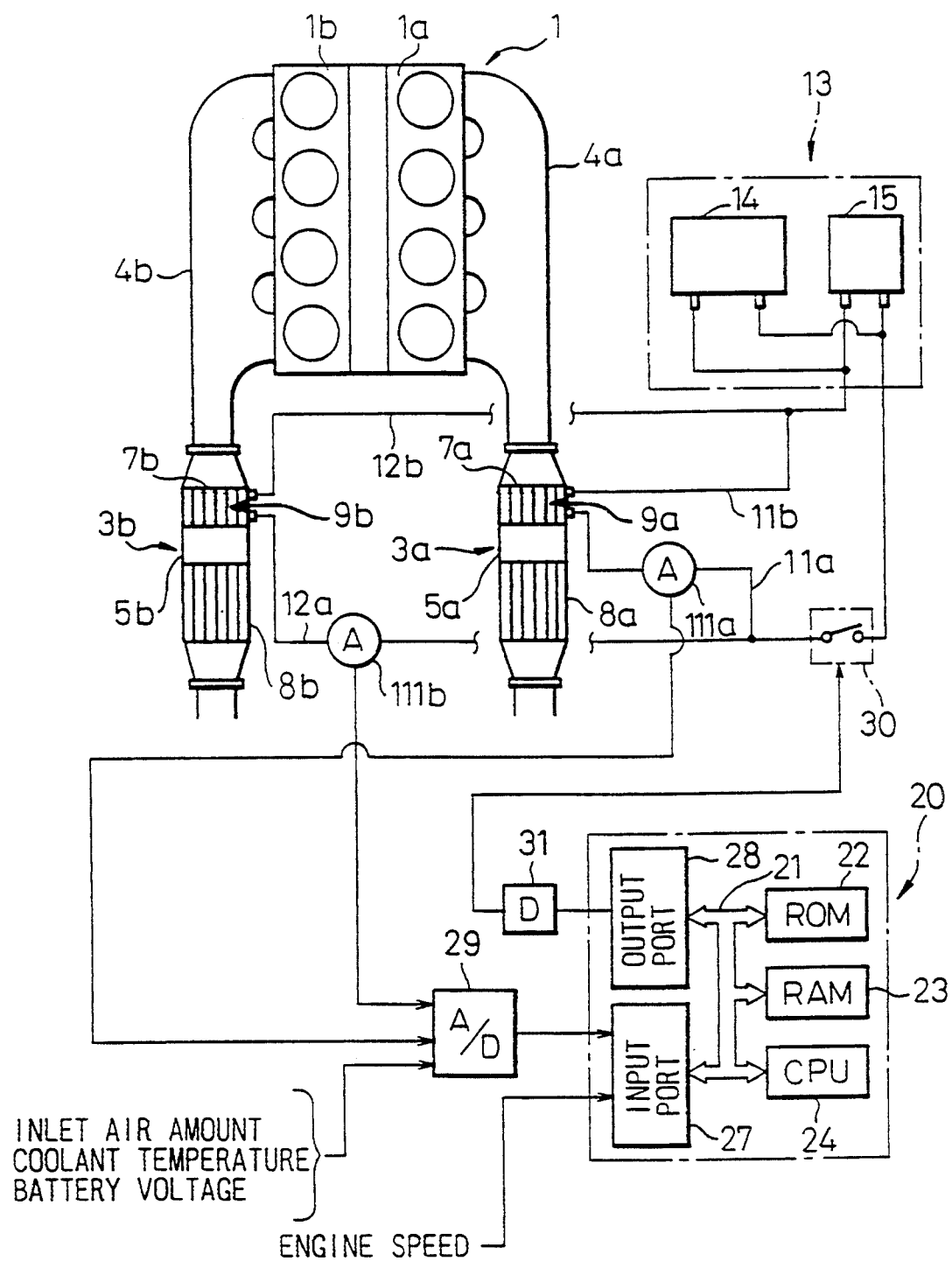
FIG. 10 is a schematic view of an internal combustion engine showing an embodiment of the present invention.

FIG. 10 shows an arrangement of the electrically heated converter system according to the invention, but different from FIGS. 1 and 6.

In the embodiments explained above, the failure of the converter system is detected by the difference in the temperature rise of the heater-converters. Therefore, the failure of both the heaters and catalysts can be detected. However, for this purpose, the temperature sensors detecting catalyst bed temperatures are required (17a and 17b shown in FIGS. 1, 3 and 6). This increases the complexity of the system and can be another cause of failures.

In the actual electrically heated catalytic converter system, most failures are caused by insufficient heat generation of the heaters due to disconnection or corrosion of lead wires or heating elements, and the failures caused by the deterioration of the catalyst is relatively rare.

Therefore, in the embodiment shown in FIG. 10, the condition of electricity supplied to the heaters 9a and 9b, instead of temperatures of the heater-converters are monitored to detect only the failures of the electric heaters 9a and 9b. By this arrangement, the converter system is greatly simplified since the temperature sensors can be omitted.

In FIG. 10, same reference numerals as those in FIGS. 1 and 6 represent similar elements. As seen from FIG. 10, the temperature sensors 17a, 17b shown in FIGS. 1 and 6 are not provided on the heater-converters 7a and 7b, but electric current detectors 111a and 111b instead of the temperature sensors are disposed on the lines 11a and 12a connecting the heaters 9a and 9b to the electric power source 13. The outputs of the current detectors 111a and 111b are fed to the input port 27 of the ECU 20 via the AD converter 29.

In this embodiment, the ECU 20 detects the failure of the heaters in accordance with the value of the electric currents IA and IB flowing through the heaters 9a and 9b. Since the heaters 9a and 9b are identical, if neither heater has failed, i.e., if there is no defect such as disconnection or corrosion of both the heater elements, the resistances of the heaters 9a and 9b must be the same. Thus, the electric currents that flow through both the heaters when the heaters 9a and 9b are switched on must be the same. Therefore, the failure of the converter system (in this case, the failure of the heaters 9a and 9b) can be detected based on the electric currents IA and IB, by a similar method to those used in FIG. 4.

Figure 11:
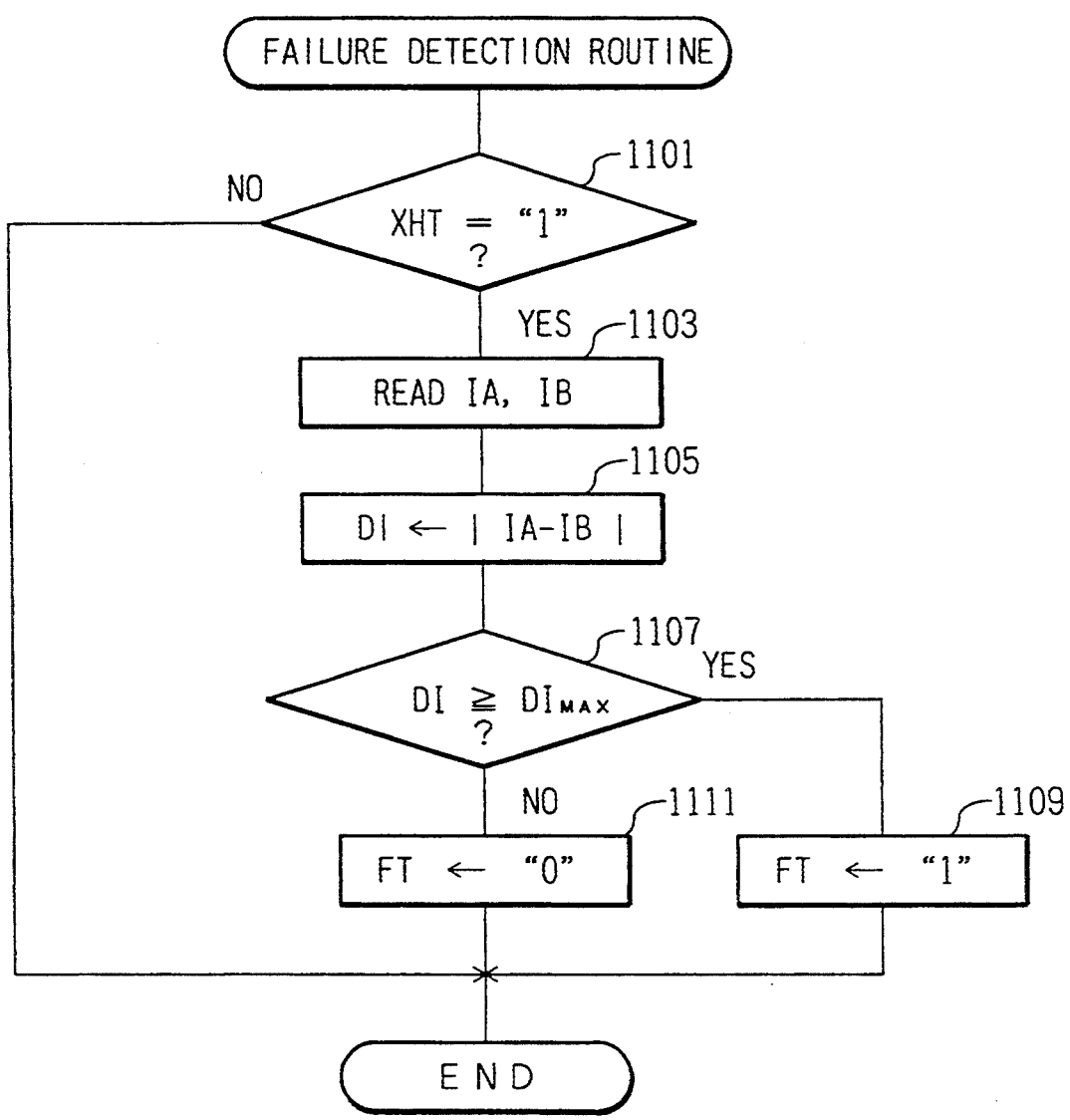
FIG. 11 is a flowchart showing an example of a routine for detecting the failure of the converter system.

FIG. 11 shows an embodiment of the routine for detecting the failure of the converter system according to the method explained above. This routine is also executed by the ECU 20 at predetermined intervals. In FIG. 11, XHT (step 1101) is the operation flag of the heaters 9a and 9b as explained in previous embodiments, IA and IB (step 1103) are the electric currents that flow through the heaters 9a and 9b, and DI (step 1105) is a difference between the currents IA and IB. Further, $DI_{MAX}$ (step 1107) is a maximum allowable difference between the currents IA and IB, FT (steps 1109 and 1111) is the alarm flag. Since the flowchart of FIG. 11 is very similar to the flowchart of FIG. 4, a detailed explanation thereof is omitted.

Figure 12:
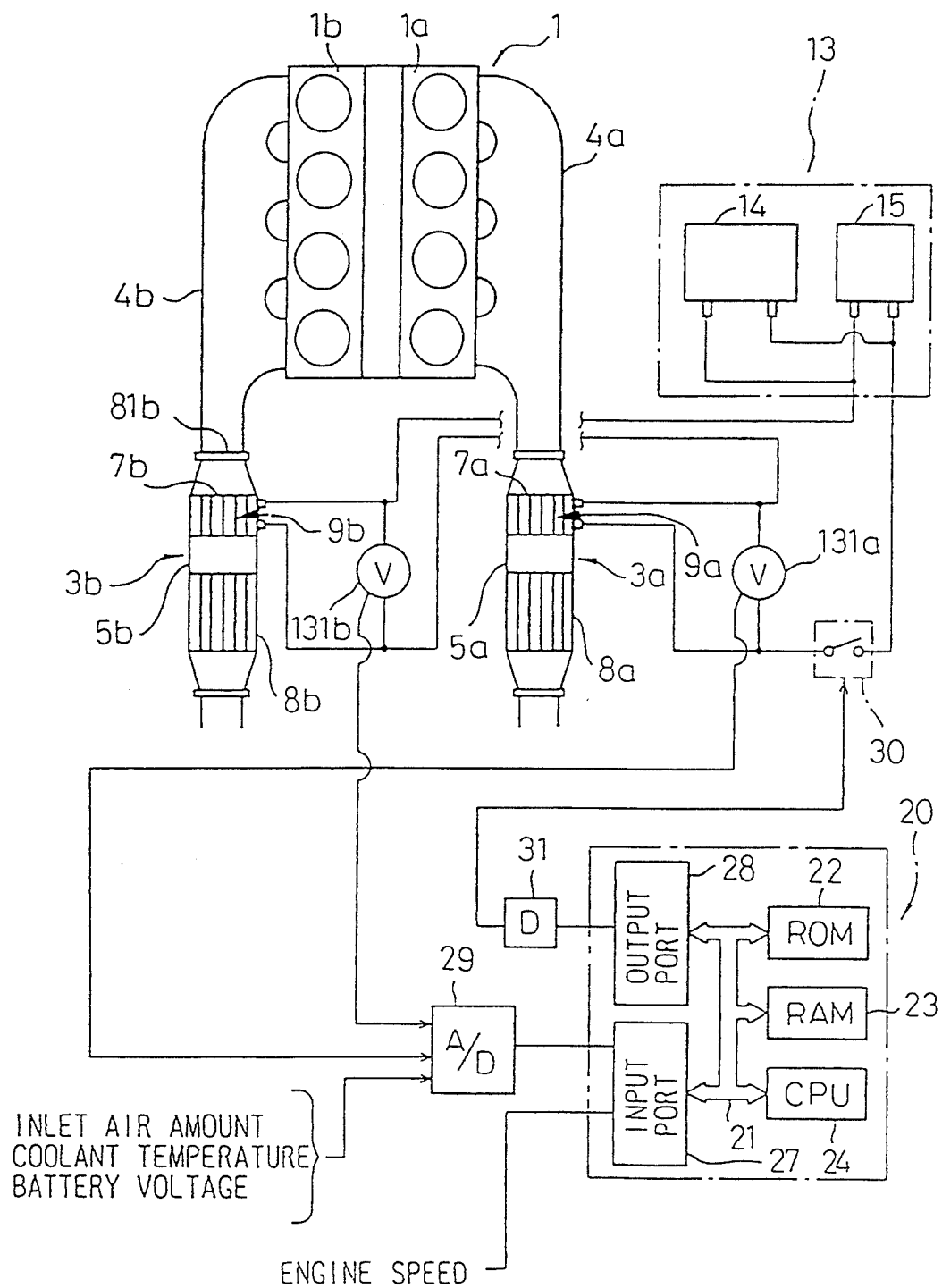
FIG. 12 is a schematic view of an internal combustion engine showing an embodiment of the present invention.

Next, FIG. 12 shows another example of the arrangement of the electrically heated converter system which utilizes the difference in the conditions of electrical supply to the heaters for detecting the failure of the converter system. This embodiments differs from the embodiment in FIG. 10 in the point that the heaters 9a and 9b are connected to the electric power source 13 in series, and voltage detectors 131a and 131b which detect the voltages between the terminals of the heaters 9a, and 9b are provided. In this embodiment, The ECU 20 detects the failure of the heaters such as disconnection or corrosion by monitoring the terminal voltages VA and VB of the heaters 9a and 9b. As explained before, the heaters 9a and 9b are identical in construction. Therefore, the voltages VA and VB across the terminals of the heaters 9a and 9b during the operation of the heaters become the same if neither heater has failed. Thus, the failure of the converter system (electric heaters) can be detected by monitoring the difference between the voltages VA and VB in a similar manner as explained in FIGS. 4 and 11.

Figure 13:
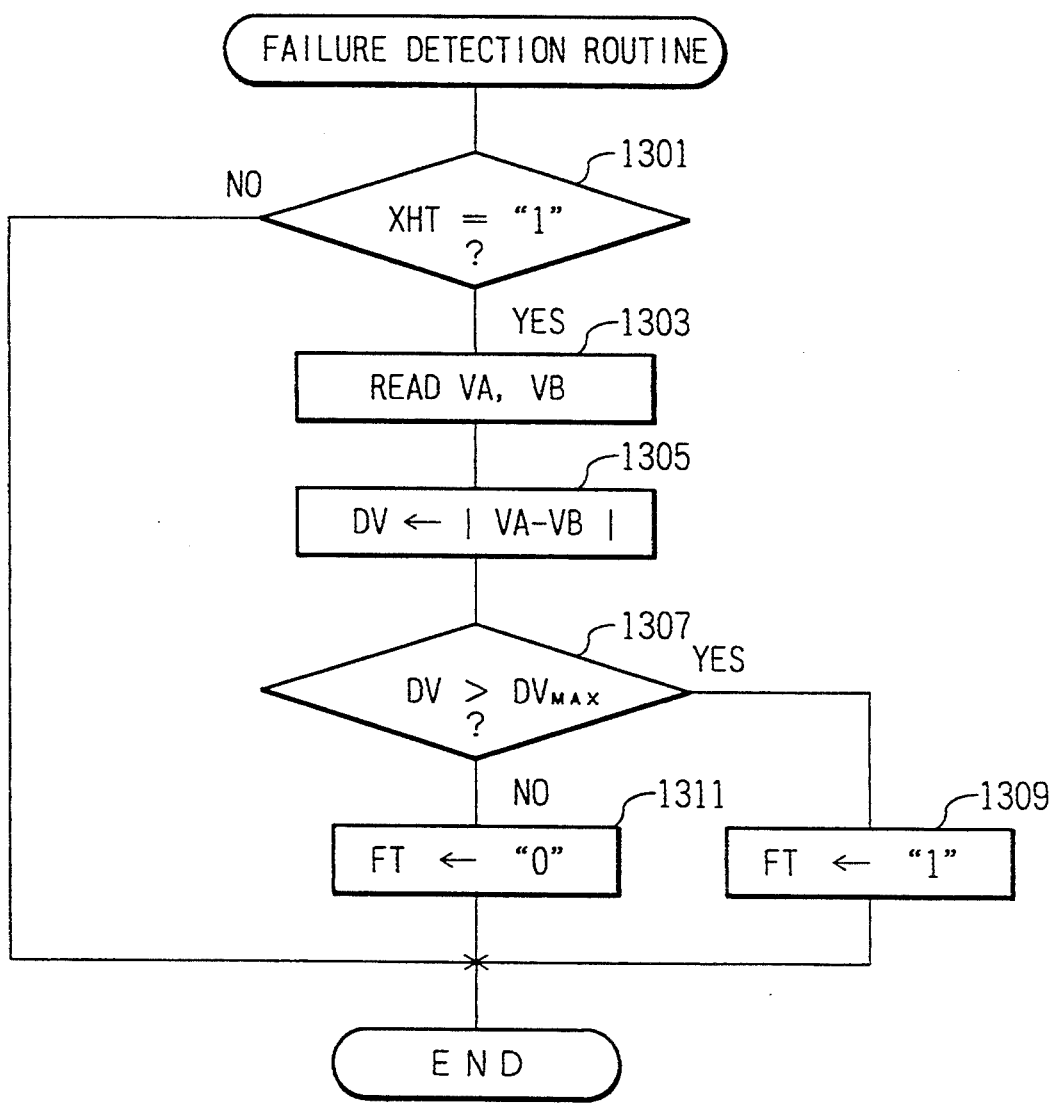
FIG. 13 is a flowchart showing an example of a routine for detecting the failure of the converter system.

FIG. 13 shows a routine for detecting the failure of the converter system in FIG. 12. In FIG. 13, VA and VB (step 1303) are the terminal voltages of the heaters 9a and 9b, DV (step 1305) is a difference between VA and VB, and, $DV_{MAX}$ (step 1307) is a maximum allowable difference between the voltages VA and VB. Since the steps in FIG. 13 are similar to steps in FIG. 11, a detailed explanation thereof is also omitted.

In the embodiments shown in FIGS. 4 through 13, an alarm can be activated to warn the operator that the converter system has failed. Also in these embodiments, it is possible to provide backup circuits to recover the operation of the failed heater to some extent, for example, when one of the heater circuits is disconnected.

Figure 14:
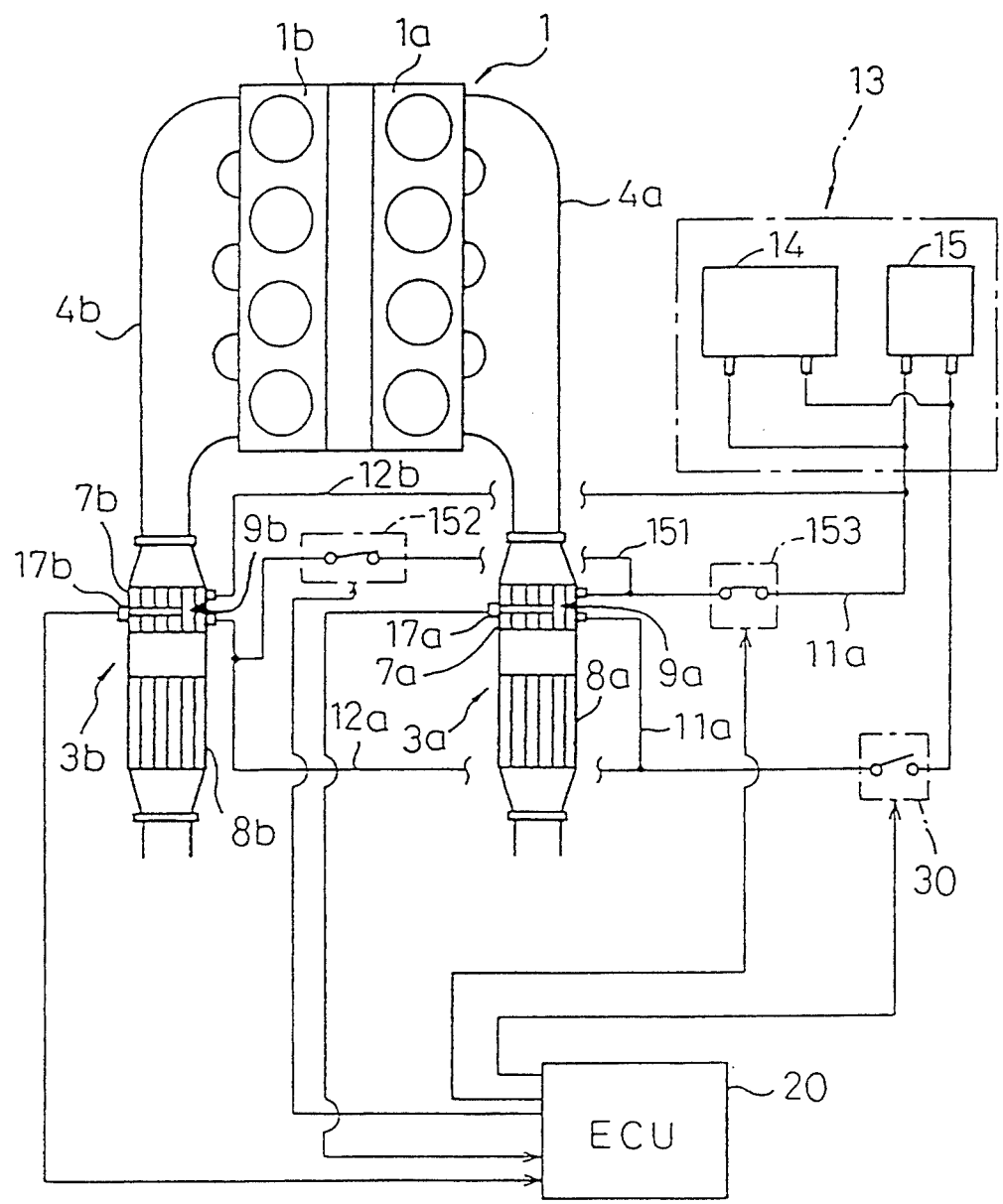
FIG. 14 is a schematic view of an internal combustion engine showing an embodiment of the present invention.
Figure 15:
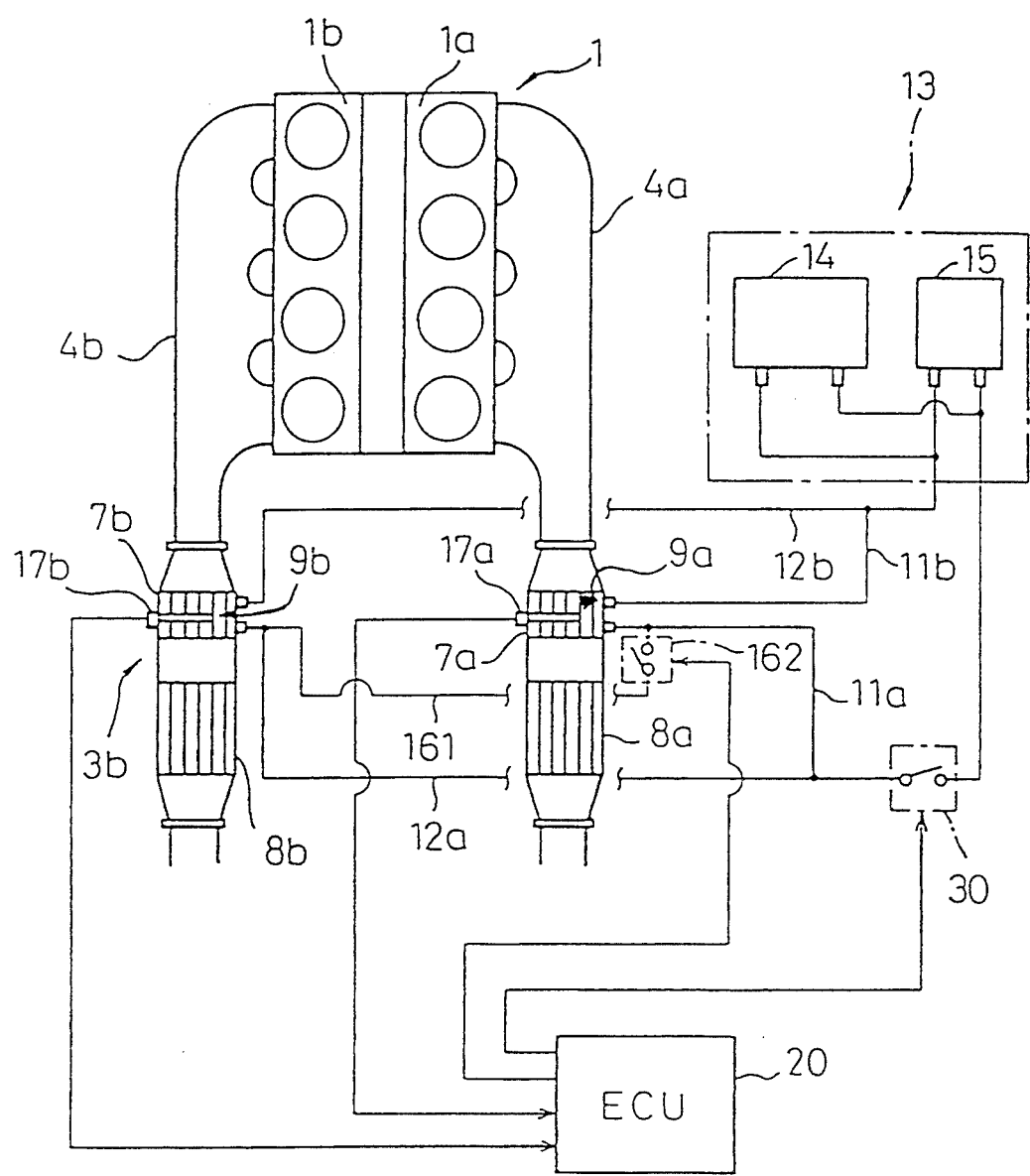
FIG. 15 is a schematic view of an internal combustion engine showing an embodiment of the present invention.

FIGS. 14 and 15 show examples of such backup circuits provided in the electrically heated catalytic converter system in FIG. 10.

FIG. 14 shows an arrangement of a backup circuit which comprises a line 151 connecting the heaters 9a and 9b in series, a normally open contact 152 disposed on the line 151, and a normally closed contact 153 disposed on the line 11b. When the failure of the heater 9b which is, for example, caused by the disconnection of the line 12a is detected, the ECU 20 closes the contact 152 and opens the contact 153. Thus, a series circuit consisting of the power source 13, line 11a, heater 9a, line 151, heater 9b, line 12b is formed to recover the operation of the heater 9b. By this backup circuit, the performance of both the heaters 9a and 9b is maintained to some extent, and the worsening of the exhaust emission at the engine start can be prevented even if the original circuit is disconnected.

FIG. 15 shows an arrangement of a backup circuit which comprises a line 161 connecting the heater 9b to the line 11a and a normally opened contact 162 disposed on the line 161.

In this case, if the heater 9b has failed due to the disconnection of the line 12a, the ECU 20 closes the contact 162 so that the heater 9b is connected to the power source 13 via the lines 12a, 161 and the contact 162 in parallel to the heater 9a. Thus, the performance of the heater 9b is recovered even if the original circuit is disconnected.

Next, another embodiment of the electrically heated catalytic converter system according to the present invention is explained. In the above embodiments shown in FIG. 4 through 13, the engine 1 is operated normally even when the converter system has failed. Therefore, the exhaust gas that flows through the failed converter is released in the air without being purified during the startup of the engine. Though it is possible to warn the driver of the converter system failure by activating the alarm, since the engine performance such as output torque is not affected by the converter system failure, the driver may ignore the alarm and may continue the operation of the engine without having the converter system repaired. In such a case, there is a possibility that the engine may be used for long time with deteriorated startup exhaust emission. The purpose of the embodiment explained hereinafter is to prevent such problems.

In this embodiment, the failure of the converter system is detected by the method of either one of the method shown in FIGS. 4, 5, 8, 9, 11 and 13. Then, if the failure is detected, the ECU 20 determines which converter has failed, and cuts off the fuel supply to the cylinder bank of the engine connected to the failed converter by the exhaust passage. Therefore, since the cylinder bank connected to the failed converter stops operating, the exhaust gas is not supplied to the failed converter and the un-purified exhaust gas is not released to the air even when the driver continues to operate the engine with a failed converter. Further, in this embodiment, since the cylinder bank connected to the failed converter is stopped, the engine output deteriorates when the failure of the converter system is detected. Therefore, in addition to the alarm lamp, the driver is warned directly by worsened performance of the engine, and also urged to repair the failed converter.

Figure 16:
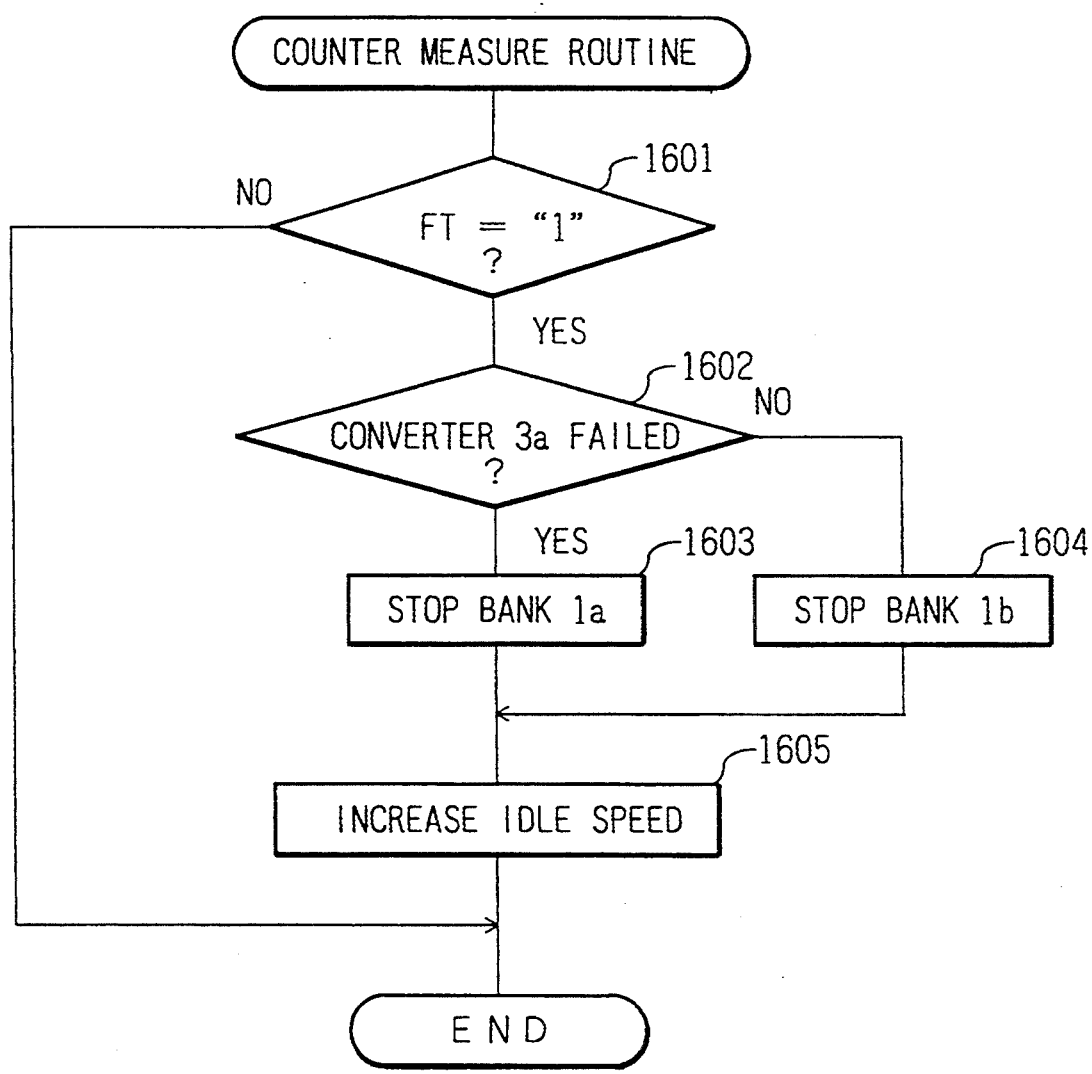
FIG. 16 is a flowchart showing a countermeasure which is taken when the converter failure is detected.

FIG. 16 shows a flowchart showing the operation of the embodiment explained above. This routine is executed by the ECU 20 after one of the routines of FIGS. 4, 5, 8, 9, 11 and 13 is performed. When the routine starts in FIG. 16, at step 1601, it is determined whether the converter system has failed. This determination is carried out based on the value of the alarm flag FT set by above routines. If it is determined that the converter system has failed at step 1601, i.e., if the value of the alarm flag FT is 1 at step 1601, then the routine proceeds to step 1602 which determines which converter has failed.

This determination is carried out by comparing the converter temperatures THA and THB, if the detection of the failure is carried out by one of the routines in FIGS. 4, 5, 8 and 9, or by comparing the electric currents IA and IB, if the detection is carried out by the routine in FIG. 11, and by comparing the voltages VA and VB, if the detection is carried out by the routine in FIG. 13. In these cases, the converter which has a lower temperature, lower electric current, and lower voltage, respectively, is determined as failed. Then, at steps 1603 and 1604, the operation of the cylinder bank which is determined as failed is stopped by cutting off the fuel supply. After cutting off the fuel supply to the cylinder bank, the setting of the idle speed of the engine is increased at step 1605 to prevent stalling of the engine due to the decrease in engine torque caused by a decrease in the number of operating cylinders.

In this embodiment, the output torque of the engine decreases when the failure of the converter system is detected and the performance of the engine becomes worse in this case. However, the detection of the failure is always carried out at the start of the engine as shown in FIGS. 4, 5, 8, 9, 11 and 13. Consequently, the operation of the cylinder bank is always stopped immediately after the engine starts, and never stopped during the normal operation of the engine. Therefore, a sudden change in the output of the engine due to the detection of the failure of the converter system never occurs during the normal operation of the engine.

Though the present invention has been described with reference to specific embodiments chosen for the purpose of illustration, it should be understood that numerous modifications could be applied by those skilled in the art without departing from the basic concept and scope of the present invention. For example, though above embodiments are explained on the basis of the present invention being applied to an eight cylinder V-type automobile engine, the present invention also can be applied to other type engines such as multiple cylinder in-line engines having a plurality of cylinder groups and the exhaust passages connected thereto. Further, the present invention can also be applied to the engines having more than two cylinder groups and exhaust passages.

I claim:

1. An electrically heated catalytic converter system for an engine having a plurality of exhaust passages, said electrically heated catalytic converter system comprising:
- a plurality of electrically heated catalytic converters each disposed on one of a plurality of exhaust passages of an engine, said electrically heated catalytic converters each comprising a catalyst bed for removing pollutants in an exhaust gas and a heating means disposed on the catalytic converter for electrically heating at least a portion of said catalyst bed after the engine starts;
- a temperature rise detecting means for detecting parameters relating to a temperature rise of each of said plurality of catalytic converters;
- a collating means for collating the values of said detected parameters of the plurality of catalytic converters; and,
- a determining means for determining that the electrically heated catalytic converter system has failed when a difference between the values of said detected parameters of two of said plurality of catalytic converters exceeds a predetermined value.

2. An electrically heated catalytic converter system according to claim 1, wherein said temperature rise detecting means comprises means for detecting temperatures of the respective catalyst beds of each of said plurality of catalytic converters, and wherein said detected temperatures of the catalyst beds are used as said parameters relating to the temperature rise of said plurality of catalytic converters.

3. An electrically heated catalytic converter system according to claim 1, wherein said temperature rise detecting means comprises means for detecting temperatures of the respective catalyst beds of each of said plurality of catalytic converters, and wherein the system further comprises a calculating means for calculating rates of increase of said catalyst bed temperatures, wherein said rates of increase of said catalyst bed temperatures are used as said parameters relating to the temperature rise of said plurality of catalytic converters.

4. An electrically heated catalytic converter system according to claim 1, wherein said temperature rise detecting means comprises means for detecting temperatures of respective streams of exhaust gases flowing into each of the plurality of catalytic converters, and means for detecting temperatures of the respective catalyst beds of each of said plurality of catalytic converters, and wherein the system further comprises a calculating means for calculating differences between the temperature of each catalyst bed and the temperature of the stream of exhaust gases flowing into each of the plurality of catalytic converters, wherein said calculated differences between the catalyst bed temperatures and the exhaust gas temperatures are used as said parameters relating to the temperature rise of each of said plurality of catalytic converters.

5. An electrically heated catalytic converter system according to claim 1, wherein said temperature rise detecting means comprises current measuring means for measuring electric currents flowing through said heating means of each of said plurality of catalytic converters, and wherein the values of said electric currents are used as said parameters relating to the temperature rise of each of said plurality of catalytic converters.

6. An electrically heated catalytic converter system according to claim 1, wherein said temperature rise detecting means comprises voltage measuring means for measuring electric voltages across terminals of said heating means of each of the plurality of catalytic converters, and wherein the values of said voltages are used as said parameters relating to the temperature rise of each of said plurality of catalytic converters.

7. An electrically heated catalytic converter system according to claim 5, wherein said determining means further comprises:
- a means for determining which of said plurality of catalytic converters has failed based on said detected parameters when it is determined that the converter system has failed; and
- a switching means for switching an electric circuit based on a position of the failed catalytic converter in order to activate a backup circuit that supplies electricity to the heating means of the failed catalytic converter.

8. An electrically heated catalytic converter system according to claim 2, wherein said determining means further comprises:
- a means for determining which of said plurality of catalytic converters has failed based on said detected parameters when it is determined that the catalytic converter system has failed; and
- a fuel cut-off means for cutting off a fuel supply to engine cylinders which are connected to the exhaust passage on which the failed catalytic converter is disposed.

9. An electrically heated catalytic converter system for an engine having a plurality of exhaust passages, said electrically heated catalytic converter system comprising:
- a plurality of electrically heated catalytic converters each disposed on one of a plurality of exhaust passages of an engine, each of said electrically heated catalytic converters comprising a catalyst bed for removing pollutants in an exhaust gas supplied to the catalyst bed and a heating means disposed on the catalytic converter for electrically heating at least a portion of said catalyst bed after the engine starts;
- first temperature detecting means for detecting temperatures of each of the catalyst beds of said plurality of catalytic converters;
- second temperature detecting means for detecting temperatures of respective streams of exhaust gases flowing into said plurality of catalytic converters;
- a first calculating means for calculating first parameters relating to a temperature rise of the respective catalyst beds based on the temperatures detected by said first temperature detecting means;
- a second calculating means for calculating second parameters relating to a temperature rise of the respective streams of exhaust gases flowing into the plurality of catalytic converters based on the temperatures detected by said second temperature detecting means;
- a difference determining means for determining a first difference between the first and second parameters of a first catalytic converter of said plurality of catalytic converters and for determining a second difference between the first and second parameters of a second catalytic converter of said plurality of catalytic converters; and a failure determining means for calculating a deviation between said first difference and said second difference and for determining that the catalytic converter system has failed when the deviation exceeds a predetermined maximum deviation.

10. An electrically heated catalytic converter system according to claim 9, wherein the catalyst bed temperatures detected by said first temperature detecting means are used as said first parameters and the exhaust gas temperatures detected by said second temperature detecting means are used as said second parameters.

11. An electrically heated catalytic converter system according to claim 9, wherein the first calculating means calculates rates of increase of said respective catalyst bed temperatures detected by said first temperature detecting means and wherein said calculated rates of increase of said catalyst bed temperatures are used as said first parameters, and wherein the second calculating means calculates rates of increase of the temperatures of the respective streams of exhaust gas detected by said second temperature detecting means and wherein said calculated rates of increase of said exhaust gas temperatures are used as said second parameters.

12. An electrically heated catalytic converter system according to claim 9, wherein said failure determining means further comprises means for determining which of said plurality of catalytic converters has failed based on said first and second parameters when it is determined that the catalytic converter system has failed, and wherein the system further comprises fuel cut-off means for cutting off a fuel supply to engine cylinders connected to an exhaust passage on which the failed catalytic converter is disposed.

13. An electrically heated catalytic converter system for an engine having at least one exhaust passage, said electrically heated catalytic converter system comprising:

at least one electrically heated catalytic converter, said at least one catalytic converter being disposed on an exhaust passage of an engine and comprising a catalyst bed for removing pollutants in an exhaust gas provided to the catalyst bed and a heating means disposed on said at least one catalytic converter for electrically heating at least a portion of the catalyst bed after the engine starts;

first temperature rise detecting means for detecting first parameters relating to a temperature rise of the catalyst bed of said at least one electrically heated catalytic converter, the first temperature rise detecting means comprising at least one temperature sensor disposed on the catalyst bed of said at least one catalytic converter;

second temperature rise detecting means for detecting second parameters related to a temperature rise of a stream of exhaust gas entering said at least one catalytic converter, the second temperature rise detecting means comprising at least one temperature sensor disposed on the exhaust passage associated with said at least one catalytic converter;

calculating means for calculating a difference between the first parameters and second parameters of said at least one catalytic converter; and determining means for determining that the catalytic converter system has failed when the calculated parameter difference of said at least one catalytic converter exceeds a predetermined maximum parameter difference.

14. An electrically heated catalytic converter system according to claim 13, wherein said first parameters represent a temperature of the catalyst bed of said at least one catalytic converter, and wherein said second parameters represent a temperature of the stream of exhaust gas entering said at least one catalytic converter.

15. An electrically heated catalytic converter system according to claim 13, wherein said first parameters represent a rate of temperature rise of the catalyst bed of said at least one catalytic converter, and wherein said second parameters represent a rate of temperature rise of the stream of exhaust gas entering said at least one catalytic converter.

16. An electrically heated catalytic converter system for an engine having at least one exhaust passage, said electrically heated catalytic converter system comprising:

at least one electrically heated catalytic converter, said at least one catalytic converter being disposed on an exhaust passage of an engine and comprising a catalyst bed for removing pollutants in an exhaust gas provided to the catalyst bed and a heating means disposed on said at least one catalytic converter for electrically heating at least a portion of the catalyst bed after the engine starts;

a first temperature rise detecting means for detecting first parameters relating to a temperature rise of the catalyst bed of said at least one electrically heated catalytic converter, the first temperature rise detecting means comprising at least one temperature sensor disposed on the catalyst bed of said at least one catalytic converter;

a second temperature rise detecting means for detecting second parameters related to a temperature rise of a stream of exhaust gas entering said at least one catalytic converter, the second temperature rise detecting means comprising at least one temperature sensor disposed on the exhaust passage connected to said at least one catalytic converter; and a determining means for determining that the catalytic converter system has failed when the value of the second parameter of said at least one catalytic converter exceeds the value of the first parameter of the catalytic converter after a predetermined period of time has elapsed after engine start-up.

17. An electrically heated catalytic converter system according to claim 16, wherein said first parameters represent a temperature of the catalyst bed of said at least one catalytic converter, and wherein said second parameters represent a temperature of the stream of exhaust gas entering said at least one catalytic converter.

* * * * *